US012577880B2

(12) United States Patent
Shang et al.

(10) Patent No.: US 12,577,880 B2
(45) Date of Patent: Mar. 17, 2026

(54) ROTOR BLADE, METHOD FOR MANUFACTURING A ROTOR BLADE AND A GAS TURBINE ENGINE

(71) Applicant: Oerlikon Surface Solutions AG, Pfäffikon, Pfäffikon (CH)

(72) Inventors: Lin Shang, Bad Ragaz (CH); Sebastien Guimond, St. Gallen (CH); Volker Derflinger, Feldkirch (AT); Toby Charles Middlemiss, Milton Keynes (GB); Thomas Wunderlich, Blankenfelde-Mahlow (DE); Dan Roth-Fagaraseanu, Blankenfelde-Mahlow (DE); Susanne Schrüfer, Blankenfelde-Mahlow (DE)

(73) Assignee: OERLIKON SURFACE SOLUTIONS AG, PFÄFFIKON, Pfäffikon (CH)

( * ) Notice: Subject to any disclaimer, the term of this patent is extended or adjusted under 35 U.S.C. 154(b) by 0 days.

(21) Appl. No.: 18/846,841

(22) PCT Filed: Mar. 14, 2023

(86) PCT No.: PCT/EP2023/000020
§ 371 (c)(1),
(2) Date: Sep. 13, 2024

(87) PCT Pub. No.: WO2023/174577
PCT Pub. Date: Sep. 21, 2023

(65) Prior Publication Data

US 2025/0207502 A1 Jun. 26, 2025

(30) Foreign Application Priority Data

Mar. 16, 2022 (EP) .................................... 22162560

(51) Int. Cl.
*F01D 5/28* (2006.01)
*C23C 28/00* (2006.01)
*F01D 5/20* (2006.01)

(52) U.S. Cl.
CPC ............... *F01D 5/288* (2013.01); *F01D 5/20* (2013.01); *C23C 28/3215* (2013.01);
(Continued)

(58) Field of Classification Search
CPC . F01D 5/288; F01D 5/286; F01D 5/20; F05D 2220/32; F05D 2230/312;
(Continued)

(56) References Cited

U.S. PATENT DOCUMENTS 4,169,020 A * 9/1979 Stalker ...................... F01D 5/20 205/110
4,735,656 A * 4/1988 Schaefer ................ C22C 32/00 75/238

(Continued)

FOREIGN PATENT DOCUMENTS

CN 207747881 U * 8/2018
DE 102005060712 A1 * 6/2007 .............. F01D 11/12

(Continued)

OTHER PUBLICATIONS

Watson, M., et al., "Effects of blade surface treatments in tip-shroud abradable contacts", Wear, 338-339 (2015), pp. 268-281; http://dx.doi.org/10.1016/j.wear.2015.06.018.

(Continued)

*Primary Examiner* — Brian Christopher Delrue
(74) *Attorney, Agent, or Firm* — Chrisman Gallo Tochtrop LLC

(57) ABSTRACT

A rotor blade in a gas turbine engine having a coating on a blade tip of the rotor blade. The coating includes an oxidation resistant abrasive layer and the rotor blade tip having at
(Continued)

least partially an oriented surface with a normal vector with a component in the rotational direction of the rotor blade. A method of manufacturing the rotor blade and a gas turbine engine with the rotor blade.

11 Claims, 5 Drawing Sheets

(52) U.S. Cl.
CPC .......... *F01D 5/286* (2013.01); *F05D 2220/32* (2013.01); *F05D 2230/312* (2013.01); *F05D 2230/314* (2013.01); *F05D 2230/90* (2013.01); *F05D 2240/307* (2013.01); *F05D 2300/611* (2013.01)

(58) Field of Classification Search
CPC ......... F05D 2230/314; F05D 2240/307; F05D 2300/611; F05D 2230/90; C23C 28/3215
See application file for complete search history.

(56) References Cited

U.S. PATENT DOCUMENTS

| | | | | | |
|---|---|---|---|---|---|
| 5,476,363 | A * | 12/1995 | Freling | F01D 5/20 | 29/889.7 |
| 5,935,407 | A * | 8/1999 | Nenov | C23C 28/022 | 205/228 |
| 5,952,110 | A * | 9/1999 | Schell | F01D 11/12 | 427/427 |
| 6,194,086 | B1 * | 2/2001 | Nenov | C23C 28/00 | 428/678 |
| 6,517,959 | B1 * | 2/2003 | Beele | C23C 8/02 | 427/419.7 |
| 7,718,280 | B2 * | 5/2010 | Wilson | C23C 28/022 | 428/701 |
| 8,740,572 | B2 * | 6/2014 | Hoebel | F01D 5/20 | 415/173.1 |
| 10,415,400 | B2 * | 9/2019 | Uihlein | C23C 14/35 | |
| 10,822,967 | B2 * | 11/2020 | Martel | C25D 15/00 | |
| 11,168,578 | B2 * | 11/2021 | Farrell | F04D 29/563 | |
| 2001/0055653 | A1 * | 12/2001 | Dopper | B08B 7/0035 | 134/1.1 |
| 2002/0164430 | A1 * | 11/2002 | Heimberg | C23C 28/042 | 427/419.1 |
| 2003/0027012 | A1 * | 2/2003 | Spitsberg | C23C 4/18 | 427/454 |
| 2004/0091627 | A1 * | 5/2004 | Ohara | C23C 26/02 | 228/245 |
| 2004/0096318 | A1 * | 5/2004 | Ohara | F01D 11/122 | 415/173.4 |
| 2007/0190351 | A1 * | 8/2007 | Eichmann | C23C 28/322 | 428/622 |
| 2008/0102296 | A1 * | 5/2008 | Ghasripoor | C23C 14/18 | 427/580 |
| 2010/0226782 | A1 * | 9/2010 | Eichmann | F01D 5/286 | 416/241 B |
| 2011/0103968 | A1 * | 5/2011 | Hoebel | C23C 28/02 | 29/889.71 |
| 2011/0195261 | A1 * | 8/2011 | Kurapov | C23C 30/00 | 106/286.2 |
| 2012/0288639 | A1 * | 11/2012 | Hanrieder | C23C 28/3455 | 219/601 |
| 2014/0234096 | A1 * | 8/2014 | Klam | C23C 28/42 | 415/217.1 |
| 2015/0023815 | A1 * | 1/2015 | Tetzlaff | F04D 1/04 | 417/365 |
| 2016/0010471 | A1 * | 1/2016 | Pabla | C23C 4/11 | 428/323 |
| 2016/0333706 | A1 * | 11/2016 | Uihlein | C23C 28/345 | |
| 2016/0362985 | A1 * | 12/2016 | Lacy | F01D 9/041 | |
| 2017/0096906 | A1 * | 4/2017 | Werner | F01D 11/125 | |
| 2017/0122034 | A1 * | 5/2017 | Nichols | E21B 28/00 | |
| 2017/0335697 | A1 * | 11/2017 | Windprechtinger | C23C 28/44 | |
| 2018/0172166 | A1 * | 6/2018 | Chapman | F16K 7/063 | |
| 2019/0390556 | A1 * | 12/2019 | Kim | C23C 14/30 | |
| 2023/0063923 | A1 * | 3/2023 | Downs | F01D 9/02 | |

FOREIGN PATENT DOCUMENTS

| | | | | |
|---|---|---|---|---|
| DE | 102010052729 | A1 * | 5/2012 | F01D 11/122 |
| IT | MI20101528 | A1 * | 2/2012 | F04D 29/563 |

OTHER PUBLICATIONS

International Search Report and Written Opinion of International Application No. PCT/EP2023/000020, dated May 19, 2023, 14 pages.

* cited by examiner

ROTOR BLADE, METHOD FOR MANUFACTURING A ROTOR BLADE AND A GAS TURBINE ENGINE

CROSS-REFERENCE TO RELATED APPLICATIONS

This is a National Stage application of PCT International Application PCT/EP2023/000020, filed on Mar. 14, 2023, which claims the benefit of European Patent Application No. 22162560.1, filed on Mar. 16, 2022, both of which are incorporated herein by reference in their entirety.

The invention relates to a rotor blade in a gas turbine engine and a method for manufacturing a rotor blade.

In a gas turbine engine, the quality of the sealing system between the rotating and stationary components strongly impacts the efficiency of the gas turbine engine.

Therefore, maintaining a minimum clearance between rotating and stationary components during nominal and/or transient operation is of importance. It is known to achieve this by a combination of an abradable coating on the seal segment of the turbine shroud and an abrasive coating on the rotor blade tip.

The abradable coating is usually porous and only weakly bonded, enabling the formation of a seal by having the abrasive rotor blade tip cut a track through the abradable coating during the first run.

The rotor blade tip coating is additionally used to protect the rotor blade tip from wear and oxidation. Known rotor blade tip coatings comprise abrasive particles (such as cubic boron nitride) which are embedded in a matrix (such as MCrAlX). "M" stands for a metal, which is mostly cobalt, nickel or a cobalt-nickel alloy. "Cr" stands for chromium, "Al" for aluminum and "X" stands for yttrium or hafnium.

Such coatings are applied according to the prior art by complex and cost-intensive processes such as electrolytic or electrophoretic deposition (U.S. Pat. No. 5,935,407 A). FIG. 1 shows a schematic illustration of a typical cross section of such a coating.

Rotor blade tip coatings realized in this way can exhibit poor layer adhesion. In the corresponding coating process, the energy input is relatively low and there is hardly any interdiffusion at the interface between the coating and substrate. The interdiffusion normally ensures strong chemical bonding or adhesion. As a result, failure and delamination of the entire layer or the abrasive particles can already occur during blade rotation due to the high centrifugal force.

In addition, both the abrasive particles and the matrix used in the prior art are not resistant to oxidation at high temperatures and fail due to the oxidation. The abrasive particles typically used have a particle size in the order of magnitude of the layer thickness and can therefore extend from the surface to the interface between the coating and substrate. If the particle is oxidized, the blade material or the corresponding interface can be attacked by oxidation easily and quickly. Furthermore, the matrix used in the prior art is susceptible to creep at high temperatures and become too soft to anchor the hard abrasive particles.

Therefore, improvements in the design of rotor blades and in the method for manufacturing are required.

The issue is addressed by a rotor blade in a gas turbine engine with a coating on the blade tip of the rotor blade comprising an oxidation resistant abrasive layer and the rotor blade tip having at least partially an oriented surface having a normal vector with a component in the rotational direction of the rotor blade. Such a rotor blade tip comprises an oriented surface which is positioned in a specific relation to the rotational direction.

The advantage of a rotor blade tip with such an oriented surface is that the force distribution on the rotor blade tip when cutting into the abradable material is almost normal to the coating layer of the rotor blade tip. This reduces the risk of a coating layer shearing or tearing off, as can happen with prior art rotor blades with a transverse force along the coating layers. In addition, the force and friction are distributed over a larger area, reducing frictional heat and wear.

This advantage holds also for rotor blades with coatings, created with other methods such as PVD. PVD coatings are more adherent, oxidation and abrasion resistant. Especially cathodic arc evaporation technology is of particular interest for applying rotor blade tip coating for the following reasons: a higher energy input of the ions can be achieved by cathodic arc evaporation technology, contributing to strong layer adhesion and dense coating structure; Cathodic arc evaporation technology can realize deposition of various materials and their combinations as well as can realize sophisticated layer architectures, thus achieving unique coating properties. By designing coating materials and tuning coating parameters, the coating can be adapted to different substrate materials and application needs. Cathodic arc evaporation technology is widely used in industry because of its high coating rate and production safety.

The tip rub behaviors of PVD and electrolytically coated rotor blade tips are however different. For electrolytically coated rotor blade tips, as illustrated in FIG. 1, the hard extruded cubic boron nitride abrasive particles are embedded in the MCrAlX matrix on the flat rotor blade tip. They do the cutting into the abradable coating through the local contact between the sharp corners and facets of the particles and the abradable coating. PVD coating, on the other hand, has an abrasive coating applied along the profile of a flat rotor blade tip, so that the incision into the abradable coating is made by complete contact between the entire coated rotor blade tip surface and the abradable coating.

The friction, thus the frictional heat generated during the rub event is much higher for the PVD coating compared to the electrolytically coated blade tips due to the larger contact area between coated rotor blade tip and abradable coating. However, these thermal properties are the reason for possible failure of the PVD coating on the rotor blade tips. It was shown that the high temperature leads to an extreme increase in wear of a multilayer CrAlN PVD coated flat rotor blade tip (Watson, M., Fois, N. and Marshall, M. B. (2015) *Effects of blade surface treatments in tip-shroud abradable contacts*. In: Wear, Volumes 338-339, 15 Sep. 2015, Pages 268-281, ISSN 1873-2577). It is reported that due to the poor high temperature tribological properties of the CR(Al)N PVD coating, parts of the coating are torn off and remain stuck in the abradable. These hard particles in the abradable prevent the abrasion and wear down the rotor blade tip much faster, grinding through the coating and exposing the underlying substrate to oxidation. In the study also a chamfer was applied on the rotor blade tip, wherein the oriented surface of the chamfered rotor blade tip had a normal vector with a component opposite to the rotational direction of the blade. With that modification the CrAlN PVD coated chamfered rotor blade tip had much better cutting performance, but still the chamfered rotor blade tip was worn flat and the coating was removed from the tip and flank face near the tip, so the coating failed to protect the rotor blade tip from oxidation.

Therefore, it is known that usually rotor blade tips with coatings that produce higher layer adhesion, such as PVD coatings, experience higher wear and temperature of the rotor blade tip coating and consequently failure of the coating. Rotor blades with such a coating benefit especially from a rotor blade tip according to the claims since this greatly reduces frictional heat and wear.

In one embodiment, the rotor blade tip has a multilayer coating comprising an oxidation resistant abrasive layer on top of a layer of MCrAlX, where M comprises one or more of Ni and Co and X comprises one or more of Y and Hf.

In one embodiment, the oxidation resistant abrasive layer comprises oxides, borides, carbides, nitrides, or a mixture thereof.

In one embodiment, the oriented surface is during operation convex or concave relative to an abradable coating.

In one embodiment, at least a part of the rotor blade tip is chamfered in a way that the chamfered oriented surface has a normal vector with a component in the rotational direction of the rotor blade.

In one embodiment, at least a part of the rotor blade tip is chamfered with a chamfer angle between 1 and 30 degrees and in another embodiment, this chamfered plane comprises and edge radius between 5 and 200 μm.

In one embodiment, at least a part of the rotor blade tip is curved in a way that the curved oriented surface has at least one normal vector with a component in the rotational direction of the rotor blade.

The issue is also addressed by a method with the features of claim 9.

Some embodiments are explained in more detail with the help of the following figures.

Figure 1:
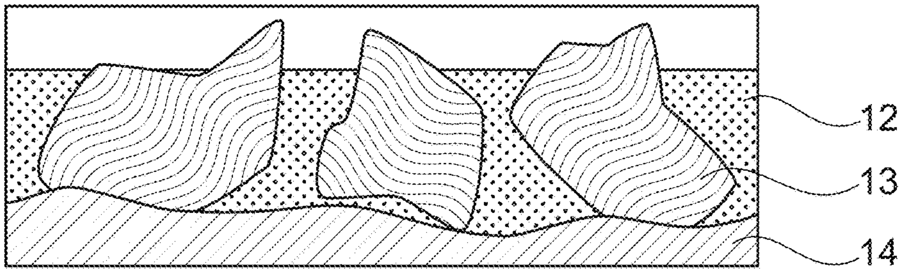
PRIOR ART Fig. 1
FIG. 1 shows a prior art coated rotor blade tip.
Figure 13:
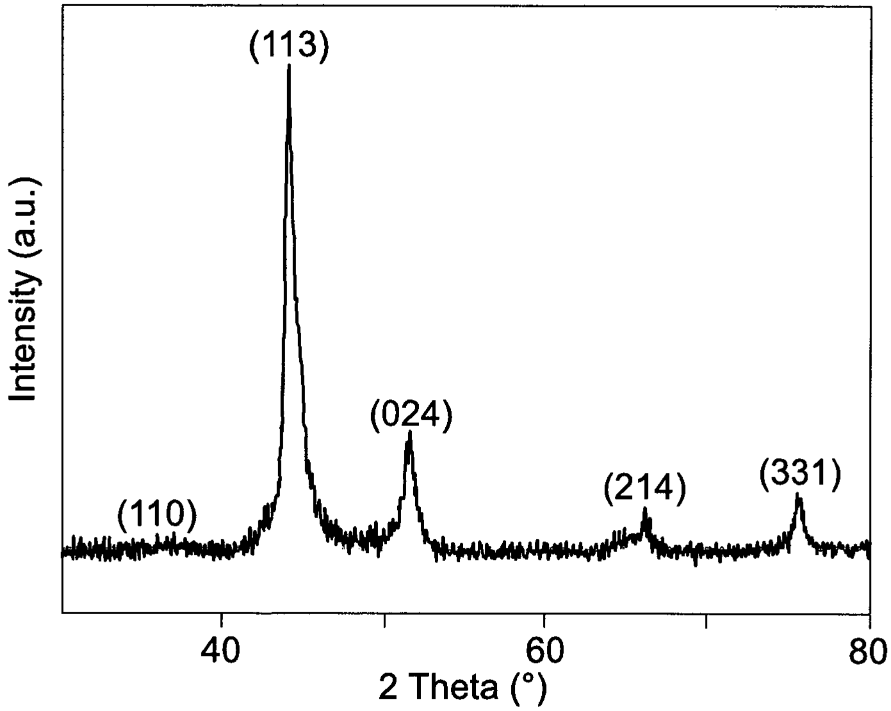

FIG. 13 shows an X-ray diffractogram of an embodiment of the rotor blade tip coating FIG. 1 shows a schematic illustration of coated rotor blade tip according to the prior art. The coating is applied on the blade substrate 14 and comprises typically of abrasive particles 13 (such as cubic boron nitrides) embedded in an MCrAlX matrix 12. Such coatings are applied by electrolytic or electrophoretic deposition. It can be seen that a possible abrasion process occurs mainly on the surfaces and edges of the abrasive particles 13 protruding from the MCrAlX matrix 12.

Figure 2:
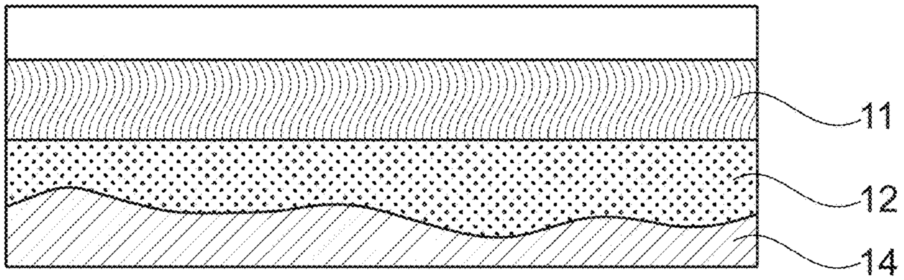
FIG. 2 shows an embodiment of the rotor blade tip coating.

FIG. 2 shows a schematic representation of an embodiment of the rotor blade tip coating 10, which is applied to the blade substrate 14 and comprises an MCrAlX layer 12 as an intermediate layer and an oxidation resistant abrasive layer 11. The blade substrate 14 may be a superalloy such as a single crystal superalloy, for example CMSX4. The MCrAlX layer 11 serves both as an adhesion agent between the blade substrate 14 and the oxidation resistant abrasive layer 11 and as an anti-oxidation layer.

The oxidation resistant abrasive layer 11 could be an aluminum chromium oxide ceramic that is resistant to oxidation at high temperatures because it is already oxidized and is also highly abrasive since it is very hard with a hardness according to Vickers hardness test of over 2000HV. Similarly many other oxides, borides, carbides, nitrides and other ceramics are working for the same reason that they are oxidation resistant and abrasive. In case of an oxidized layer, it would risk oxidation of the lower blade substrate 14 if there were not an MCrAlX interlayer 12. Compared to the previous figure, which shows a state-of-the-art coating, it can be clearly seen that the area where possible abrasion occurs is much larger, since it takes place on the entire surface of the oxidation resistant abrasive layer 11.

Figure 3:
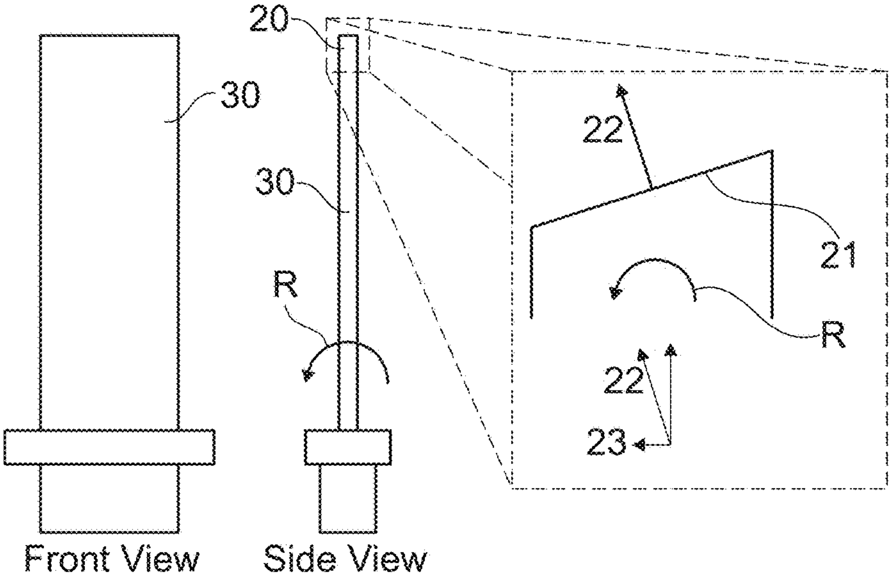
FIG. 3 shows the rotor blade from a front and side view and a magnified view of the rotor blade tip.

FIG. 3 shows a schematic representation of the front and side views of a rotor blade 30 and a magnified view of the rotor blade tip 20, which represents one embodiment of the rotor blade tip geometry.

The counterclockwise direction of rotation of the rotor blade R is indicate by an arrow. For simplicity, a flat vertical profile is assumed for the front and side views, hence the simplified geometry of the rotor blade 30.

As an example, an IN718 blade can be selected as rotor blade 30 with a rotor blade tip 20 of 1 mm width. A flat rotor blade tip geometry is disclosed in the state-of-the-art, but one embodiment of the rotor blade tip geometry is represented by a chamfered rotor blade tip. This chamfered rotor blade tip geometry results in an oriented rotor blade tip surface 21 with a normal vector 22 having a component 23 in the direction of rotation of the rotor blade R. The normal vector 22 defines an oriented surface at the rotor blade tip 20 which can interact with an abradable coating 16, as will be described below.

Figure 4:
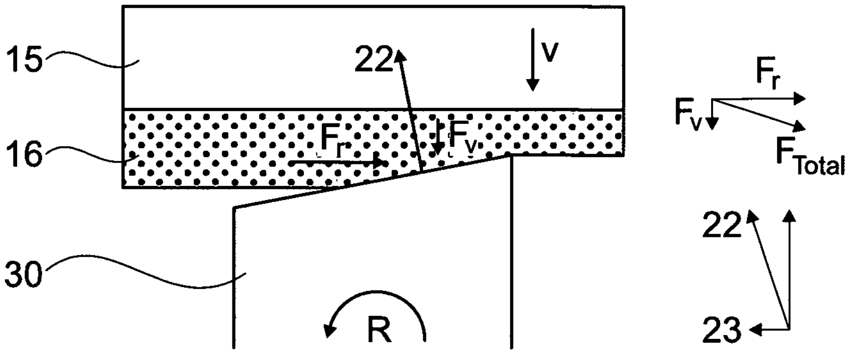
FIG. 4 shows an embodiment of the rotor blade tip geometry with the interacting forces.

FIG. 4 shows a schematic representation of one embodiment of a rotor blade 30 with a rotor blade tip 20, which cuts into the abradable coating 16 of a turbine shroud 15. The oriented surface—as defined by the normal vector 22—is tilted towards the abradable coating 16 in the direction of the rotation of the rotor blade R.

The rotor blade 30 can move into the turbine shroud 15, such as during thermal expansion or when the turbine is displaced off center by vibration. Physically, it would be the same if the turbine shroud 15 moved into the rotor blade 30. Therefore, an incursion test involves testing the interaction between the rotor blade tip 20 and the abrasion resistant coating 16 by moving the turbine shroud into the rotor blade at an incursion speed v. However, the same physical processes occur as in the real turbine under operation.

Figure 5:
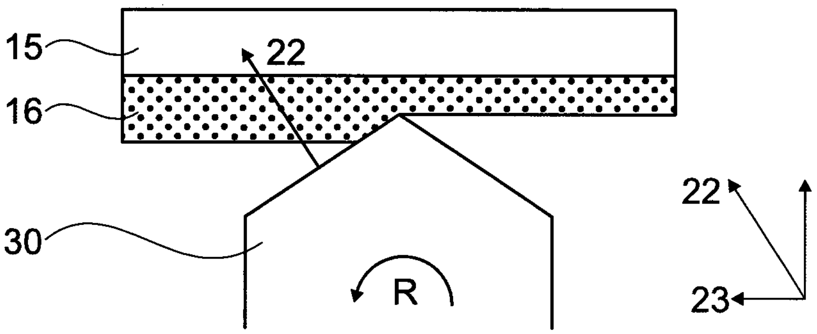
FIGS. 5-8 show embodiments of the rotor blade tip geometry.

When the rotor blade tip 20 of the rotor blade 30 moves into the abradable coating 16 of the turbine shroud 15 or vice versa, the rotor blade tip experiences a force from the incursion movement into the abradable $F_v$ and a force coming from the rotational movement into the abradable coating 16 $F_r$, this results in a total force $F_{Total}$ as illustrated in FIG. 5.

The direction of the total force $F_{Total}$ depends on the fraction of the incursion force $F_v$ and rotational force $F_r$.

The advantage of a rotor blade tip 20 having at least partially an oriented surface 21 with a normal vector 22 with a component 23 in the direction of rotation of the rotor blade R is that in this case the total force vector $F_{Total}$ is somewhat aligned with the normal vector 22, e.g. they point almost in opposite directions or have components pointing in opposite directions. Depending on the shape of the oriented surface with the normal vector 22, the weighting of the vector components counteracting the vector $F_{Total}$ can be chosen. In the embodiment shown, the oriented surface is a plane (i.e. the chamfered plane) which can be described by on normal vector 22. In other embodiments—as will be shown below—the oriented surface 21 has at least locally a curvature so that normal vectors 22 describe the orientation locally. But in any case the oriented surface will have some component 23 in the rotational direction of the rotor blade R.

This results in a force distribution normal to the coating of the rotor blade tip 10 instead of a transverse force along the coating layers or a force on the flank of the rotor blade tip 20.

With that the risk of a coating layer shearing or tearing off is significantly reduced. Additionally, the friction is distributed over a larger area, reducing local frictional heat and reducing a wear process on the coated rotor blade tip associated with temperature. Together, this could be a possible explanation for the increase in performance. The shown chamfered rotor blade tip geometry is to be seen as only one embodiment of the rotor blade tip geometry and is not limiting.

Figure 6:
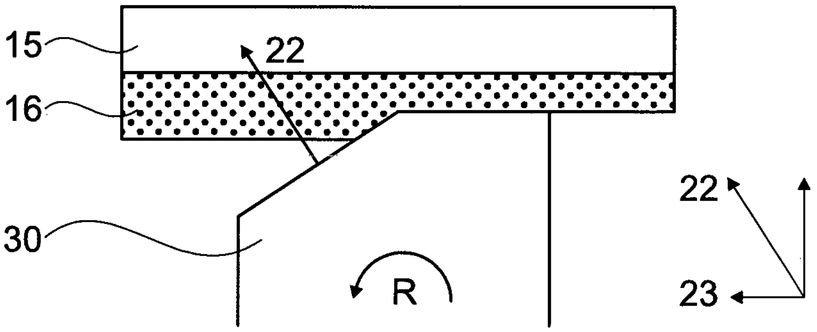
Figure 7:
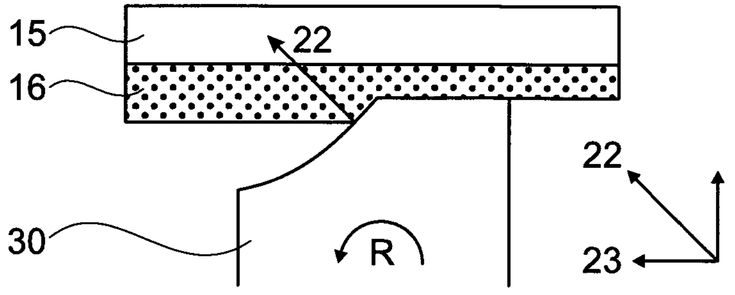
Figure 8:
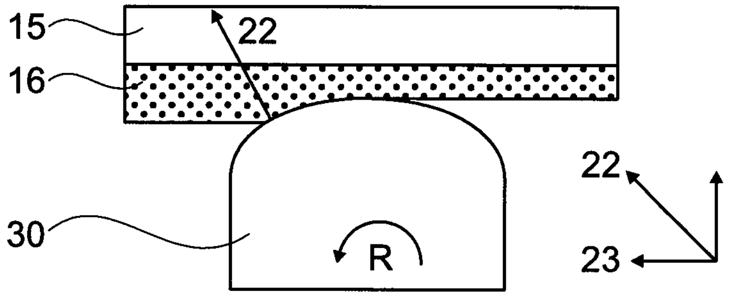

FIGS. 5-8 show other embodiments of the rotor blade tip geometry. In FIGS. 5 and 6 a chamfered rotor blade 30 with a normal vector 22 having a component 23 in the direction of rotation of the rotor blade R is shown. In FIGS. 7 and 8 a curved rotor blade is shown, where one normal vector 22 of the many possible normal vectors is illustrated, which has a component 23 in the direction of rotation of the rotor blade R. The corresponding abradable coating 16 on the turbine shroud 15 is also shown.

This shows that the oriented surface 21 can be concave (e.g. FIG. 7) or convex (e.g. FIG. 5, 6 or 8) relative to the abradable coating 16.

Figure 9:
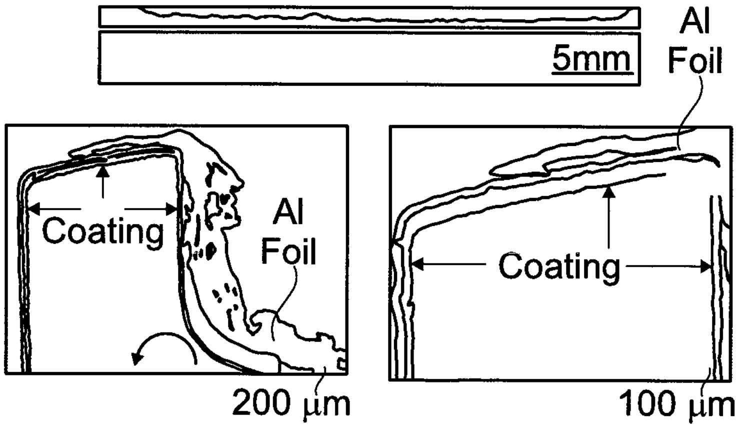
FIG. 9 shows an embodiment of the rotor blade after an incursion rub test

FIG. 9 shows an exemplary cross sectional analysis of an embodiment of the rotor blade 30. In this example the rotor blade tip 20 was coated with a multilayer consisting of an MCrAlY interlayer and an aluminum chromium oxide top layer. The rotor blade tip 20 has been chamfered with a 10° angle. The figure shows the rotor blade tip 20 after an incursion rub test. The sample was cut in the middle as indicated by the dashed line. The arrow indicates an anticlockwise rotating direction of the blade R. It is visible that the coating is still intact after the rub test and covers all sides of the rotor blade tip.

Figure 10:
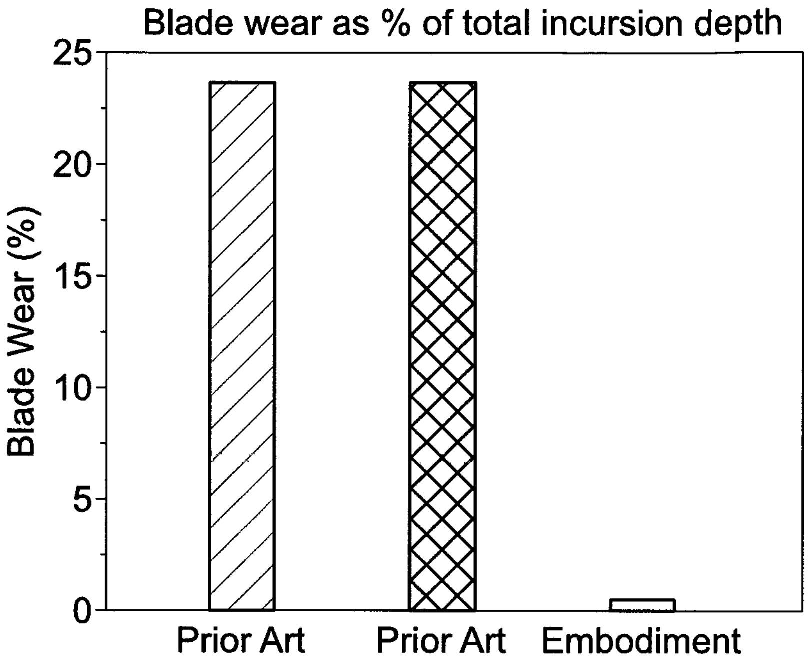
FIG. 10 shows the blade wear of an embodiment of the rotor blade and prior art rotor blades in an incursion rub test

FIG. 10 shows the blade wear as a percentage of the total incursion depth for three blade tip geometries, two of which are prior art and one of which is an embodiment of the claims. The two prior art blade tip geometries are a flat blade tip geometry and a chamfered blade tip geometry that has no oriented surface with a normal vector having a component in the direction of rotation of the rotor blade. All rotor blade tips were coated with a multilayer consisting of an MCrAlY interlayer and an aluminum chromium oxide top layer. It can be clearly seen that the blade tip with an embodiment of the claims exhibits significantly lower wear (<1%) compared to the prior art blade tips (~25%).

Figure 11:
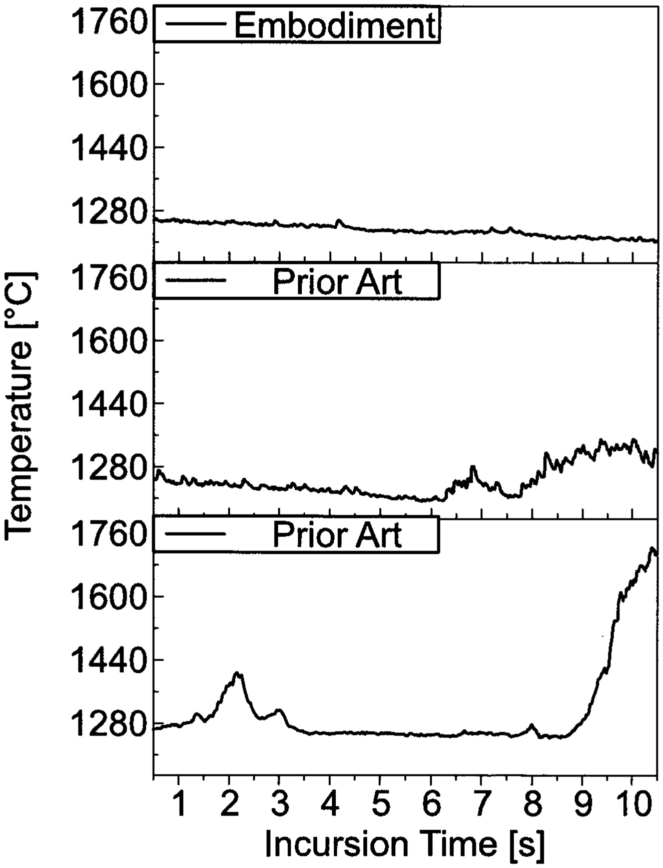
FIG. 11 shows the temperature of an embodiment of the rotor blade and prior art rotor blades in an incursion rub test

FIG. 11 shows the temperature measured at the blade tips during the incursion rub test. The two prior art blade tips experienced about 480° C. and 160° C. temperature increase respectively, whereas the embodiment of the blade tip did not experience any temperature increase at all.

Figure 12:
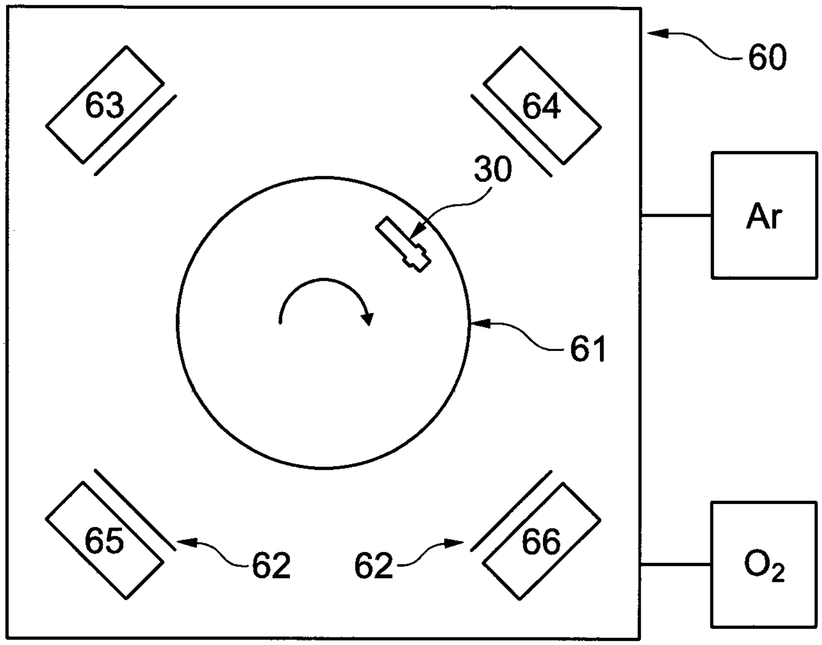
FIG. 12 shows an embodiment of a method of manufacturing a rotor blade tip coating.

An embodiment of the method of manufacturing of the rotor blade tip coating 10 can be achieved in particular by using deposits from the gas phase by means of PVD processes. This is explained exemplary in more detail with the help of FIG. 12.

The use of reactive cathodic arc evaporation is particularly preferred. By using reactive cathodic arc evaporation, the adhesion of rotor blade tip coatings 10 can be significantly improved, since a higher energy input of the ions contributes to improved layer adhesion. The coating can also be adapted to different blade substrate materials 14 and application needs. Different PVD coating materials can be used, either as single layers or combined multilayers, in order to provide the desired properties in terms of oxidation resistance at high temperature, hardness and ductility. These materials may comprise oxides, borides, carbides and nitrides. A coating of the structure MCrAlX interlayer 12 followed by an aluminum chromium oxide layer as oxidation resistant abrasive layer 11 is deposited on a rotor blade tip 20 made of a superalloy, for example CMSX4 as substrate 14.

The MCrAlX layer 12 is deposited from an MCrAlX material source or target by plasma-enhanced cathodic arc evaporation. The MCrAlX layer 12 could have a thickness of 0.1-100 μm in accordance with the required oxidation resistance. In the present example the layer thickness is chosen to be 10 μm.

The oxidation resistant abrasive layer 11 is deposited on the MCrAlX adhesive and anti-oxidation layer 12. The aluminum chromium oxide layers are deposited from metallic AlCr targets by means of reactive cathodic arc evaporation in an oxygen atmosphere. The oxide layer 11 could be 0.5 to 50 μm thick. In the present example the layer thickness is chosen to be 10 μm.

The said coating system is deposited on a rotor blade 30 using an arc deposition method. In order to apply the coating system to a rotor blade 30, using the coating method according to the claims, a rotor blade 30 is placed in a vacuum coating chamber 60. The rotor blade 30 is placed rotatable in the center of said vacuum chamber on a carousel 61. The coating system can be deposited on the rotor blade 30 by using a different amount of targets functioning as cathodes, such as for example two, four or even more targets. The order and number of the targets can be of any desired kind. The setup shown in this particular example (FIG. 3) contains four targets 63, 64, 65, 66, all of them set up in a way as to work as cathodes. The targets 63, 64, 65, 66 are mounted at the walls of the vacuum coating chamber 60. In order to produce the coating system described in this specific embodiment, cathodes 63 and 64 are targets comprising MCrAlY as main component, and cathodes 65 and 66 are targets comprising aluminum chromium (AlCr) as main component. The target positions are to be seen as only one example and are not limiting. In order to generate the oxygen ($O_2$) containing layers, a non-zero amount of $O_2$ is inserted into the vacuum chamber 60 through the gas inlet. In this example the $O_2$ pressure was set to $1.0\ 10^{-2}$ mbar. As shown in FIG. 3, an argon (Ar) gas inlet is installed as well, in order to use argon as a work gas. In order to produce the coating system, the coating temperature is chosen within a range between 200-600° C. Magnets, which are not shown in this figure, are located behind the targets, and the magnetic field can be adjusted in order to achieve variation of the coating properties. Shutters 62 can be installed in front of the targets 63, 64, 65, 66, to allow coating different layers, but are not compulsory.

FIG. 13 shows an X-ray diffractogram of an exemplary oxidation resistant abrasive layer 11, which is an aluminum chromium oxide.

Even though the embodiments have been described in the context of plasma deposition processes, chemical vapor deposition can be used at least in some steps.

LIST OF REFERENCE NUMBERS

10 rotor blade tip coating
11 oxidation resistant abrasive layer
12 MCrAlX layer
13 abrasive particles
14 blade substrate
15 turbine shroud
16 abradable coating
20 rotor blade tip
21 oriented rotor blade tip surface
22 normal vector of the oriented rotor blade tip surface
23 component of normal vector in rotational direction of the rotor blade
30 rotor blade
50 gas turbine
60 vacuum chamber
61 carousel
62 shutters
63 coating target
64 coating target.
65 coating target
66 coating target
Al Aluminum
Ar Argon
Co Cobalt
Cr Chromium
$F_v$ incursion force
$F_r$ rotational force
$F_{Total}$ total force
Hf Hafnium
M Metal
N Nitrogen
$O_2$ Oxygen
R rotational direction of the rotor blade
v incursion speed
X comprises of Yttrium or Hafnium or both
Y Yttrium

What is claimed is:

1. A rotor blade in a gas turbine engine, the rotor blade comprising a coating on a blade tip of the rotor blade, the rotor blade tip having at least partially an oriented surface with a normal vector with a component in the rotational direction of the rotor blade, wherein the rotor blade tip comprises a multilayer coating this further comprising an oxidation resistant abrasive layer on top of a layer of MCrAlX, where M comprises one or more of Ni and Co and X comprises one or more of Y and Hf.

2. The rotor blade according to claim 1, wherein the oxidation resistant abrasive layer comprises oxides, borides, carbides, nitrides, or a mixture thereof.

3. The rotor blade according to claim 1, wherein at least in parts, the oriented surface is, during operation, convex or concave relative to an abradable coating.

4. The rotor blade according to claim 1, wherein the rotor blade tip has at least partially an oriented surface comprising a chamfered plane having a normal vector with a component in the rotational direction of the rotor blade.

5. The rotor blade according to claim 4, wherein the oriented surface comprising a chamfered plane with a chamfer angle between 1 to 30 degrees.

6. The rotor blade according to claim 5, wherein the oriented surface comprising the chamfered plane with the chamfer angle between 5 to 15 degrees.

7. The rotor blade according to claim 4, wherein the chamfered plane comprises an edge radius between 5 and 200 μm.

8. The rotor blade according to claim 1, wherein at least a part of the rotor blade tip has a curved oriented surface with at least one normal vector with a component in the rotational direction of the rotor blade.

9. A method of manufacturing a rotor blade in which a coating on a blade tip of the rotor blade is deposited with plasma vapor deposition and/or chemical vapor deposition, wherein the coating is a multilayer coating comprising an oxidation resistant abrasive layer on top of a layer of MCrAlX, where M comprises one or more of Ni and Co and X comprises one or more of Y and Hf, the rotor blade tip having at least partially an oriented surface with a normal vector with a component in the rotational direction of the rotor blade.

10. The method of manufacturing a rotor blade according to claim 9, wherein the plasma vapor deposition method is cathodic arc evaporation.

11. A gas turbine engine with a rotor blade according to claim 1.

* * * * *